United States Patent [19]
Van Doremalen

[11] Patent Number: 5,835,073
[45] Date of Patent: Nov. 10, 1998

[54] ELECTRO OPTIC DISPLAY DEVICE WITH SECOND SWITCHING ELEMENT

[75] Inventor: Hendrikus C. M. Van Doremalen, Eindhoven, Netherlands

[73] Assignee: Flat Panel Display Co. B.V., Eindhoven, Netherlands

[21] Appl. No.: 398,319

[22] Filed: Mar. 3, 1995

[30] Foreign Application Priority Data

Mar. 31, 1994 [EP] European Pat. Off. .............. 94200901

[51] Int. Cl.⁶ ...................................................... G09B 3/31
[52] U.S. Cl. ................................ 345/93; 345/91; 345/92; 349/42; 349/49
[58] Field of Search .............................. 345/93, 103, 205, 345/206, 87, 90, 91, 92, 55, 69, 70; 371/21.1; 359/58–60; 349/41, 42, 43, 45, 49, 50, 51, 52, 53

[56] References Cited

U.S. PATENT DOCUMENTS

| | | | |
|---|---|---|---|
| 4,994,796 | 2/1991 | Kuijk | 345/93 |
| 5,032,831 | 7/1991 | Kuijk | 345/91 |
| 5,159,325 | 10/1992 | Kuijk | 345/84 |

*Primary Examiner*—Dennis-Doon Chow
*Attorney, Agent, or Firm*—John C. Fox

[57] ABSTRACT

An additional switching element (18) is associated with a switching element (8) in a display device (1), which additional switching element is short-circuited by a picture electrode (5) or row electrode (7) when the switching elements function normally, so that there is no voltage drop across the second switching element (18) when a pixel (11) operates satisfactorily. Consequently, the redundant element does not have any capacitive influence on the operation of the pixel or the transmission/voltage characteristic of the pixel. If the switching element (8) is defective, the second switching element (18) can be switched on.

16 Claims, 6 Drawing Sheets

— 5,835,073 —

ELECTRO OPTIC DISPLAY DEVICE WITH SECOND SWITCHING ELEMENT

BACKGROUND OF THE INVENTION

The invention relates to a display device comprising an electro-optical display medium between a first and a second supporting plate and provided with rows and column electrodes, which device comprises a plurality of facing first and second picture electrodes arranged on the supporting plates and defining pixels in the electro-optical display medium, a quantity of picture electrodes on the first supporting plate being each connected to a drive electrode or auxiliary electrode via a first switching element.

A display device of this type can be used in television applications or data graphic applications.

A display device of the type described in the opening paragraph is known from U.S. Pat. No. 4,994,796. This device comprises on one of the supporting plates a picture electrode for each pixel, which picture electrode is connected via non-linear switching elements to a row electrode and an electrode for a reference voltage. If the display device is adapted to drive, for example 625 rows and 400 columns, it comprises 250,000 pixels, hence 250,000 switching elements. It is known that defects may occur in the manufacture of these types of switching elements, resulting in an open or short-circuited switching element. To obviate this, redundancy is used in which, for example an extra switching element is arranged between the picture electrode and the column electrode. If one of the two switching elements is short-circuited (this defect occurs most frequently), the short-circuit can be eliminated by means of, for example laser repair resulting in an open connection; the switching function is then performed by one switching element. If one of the two switching elements is open, the switching function is performed by one switching element. In both cases the capacitance of the capacitor associated with the total switching element is approximately halved. (For switching elements in series, this capacitance is approximately doubled if an open connection is short-circuited). This capacitance has great influence on the operation of the display because corrections of row and/or column signals are based thereon in connection with crosstalk and capacitive kick-back. With an equal drive, the repaired pixel will therefore usually have a different transmission level than a pixel which did not need to be repaired.

In display devices including MIMs, the dropout of one of the MIMs also influences the transmission/voltage behaviour of the relevant pixel.

OBJECTS AND SUMMARY OF THE INVENTION

It is, inter alia an object of the invention to provide a display device in which the above-mentioned drawbacks are obviated as much as possible.

A display device according to the invention is characterized in that the first supporting plate is provided with a second switching element between a first electrical connection to the first switching element and the picture electrode and a second connection between the second electrical switching element and the picture electrode.

Now, the second switching element is not connected to the row or column electrode and in the normal state (unrepaired switching element) there is no voltage drop across the associated capacitor so that the signals at the row or column electrode are only subject to the influence of the capacitor associated with the first switching element. If the first switching element is short-circuited, the connection between the picture electrode and this switching element can be interrupted. The second switching element takes over the function of the first switching element, so that the signals at the row or column electrode are now only subject to the influence of the capacitor associated with the second switching element. Since only one switching element determines the behaviour as regards crosstalk, kick-back or other capacitive effects, both for a repaired and an unrepaired switching element, a more uniform behaviour is obtained.

The same advantage can be achieved with another embodiment according to the invention. This embodiment is characterized in that the first supporting plate is provided with a second switching element between a first electrical connection to the first switching element and the row electrode and a second electrical connection between the second switching element and the row electrode. In symmetrical switching elements such as MIMs, two extra switching elements for two consecutive rows or columns can advantageously be implemented as one switching element.

To further enhance the repair facilities, the switching elements may be composed of a plurality of switches.

Instead of diodes, as shown in U.S. Pat. No. 4,994,796, it is alternatively possible to choose MIMs as switching elements and a switching method as described in U.S. Pat. No. 5,159,325. The use of TFTs is alternatively possible.

If diodes are used (or more generally, asymmetrical two-pole elements) the picture electrodes are, for example, electrically connected to the common point of two asymmetrical two-pole elements which are arranged in series between a column electrode and an electrode for a reference voltage; The operation of such a device is described in U.S. Pat. No. 5,032,831.

A device according to the invention is then characterized in that the first supporting plate is provided with at least one additional asymmetrical two-pole element arranged at the same polarity as the asymmetrical two-pole elements between a electrical first connection to one of the two asymmetrical two-pole elements and the picture electrode and a second electrical connection between the additional asymmetrical two-pole element and the picture electrode.

In this respect the same polarity is understood to mean that the additional asymmetrical two-pole element between the column electrode and the electrode for the reference voltage is arranged in the same direction as the series-arranged two-pole elements.

BRIEF DESCRIPTION OF THE DRAWING

These and other aspects of the invention will be apparent from and elucidated with reference to the embodiments described hereinafter.

In the drawing

FIGS. 7 and 8 are diagrammatic plan views of the parts of the devices of FIGS. 2 and 5, while

The drawings are diagrammatic and not to scale. Corresponding elements generally have the same reference numerals.

DESCRIPTION OF THE PREFERRED EMBODIMENTS

Figure 1:
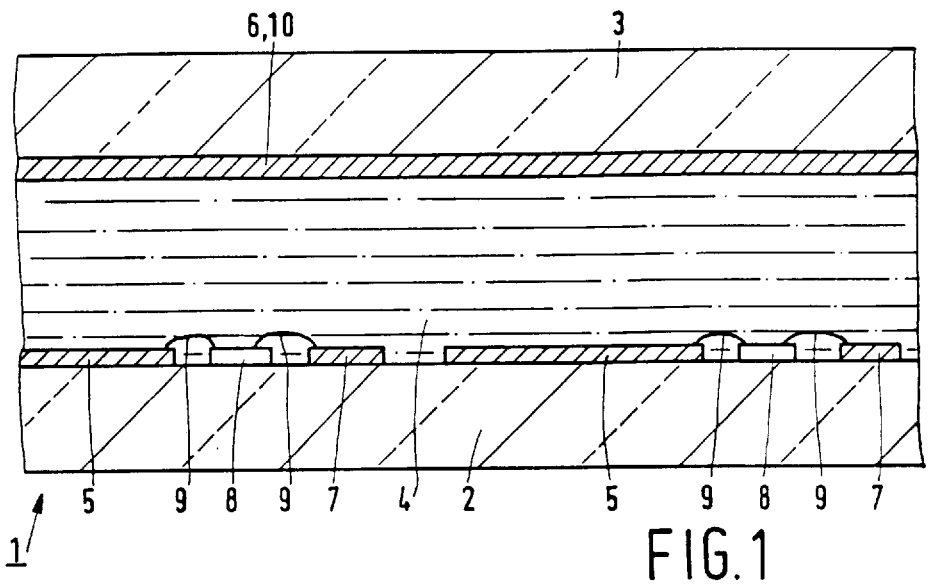
FIG. 1 is a diagrammatical cross-section of a part of a display device according to the invention.

FIG. 1 shows diagrammatically a cross-section of a part of a display device 1 having two supporting plates 2 and 3 between which an electro-optical display medium 4, in this example a liquid crystalline material, is present. The inner surfaces of the supporting plates 2 and 3 are provided with picture electrodes 5 and 6 which, together with the intermediate liquid crystalline material, define a large number of pixels arranged in rows and columns. Strip-shaped row electrodes 7 which are connected to the picture electrodes 5 via non-linear switching elements 8, in this example MIMs, are arranged between the picture electrodes 5. The connections are outside the plane of the drawing and are shown diagrammatically by means of the lines 9. In this example the picture electrodes 6 are integrated with column electrodes 10. The inner surfaces of the supporting plates 2 and 3 further have orienting layers which are not shown. The display device may be further provided with polarizers and can be realised as a transmissive or a reflective device.

Figure 2:
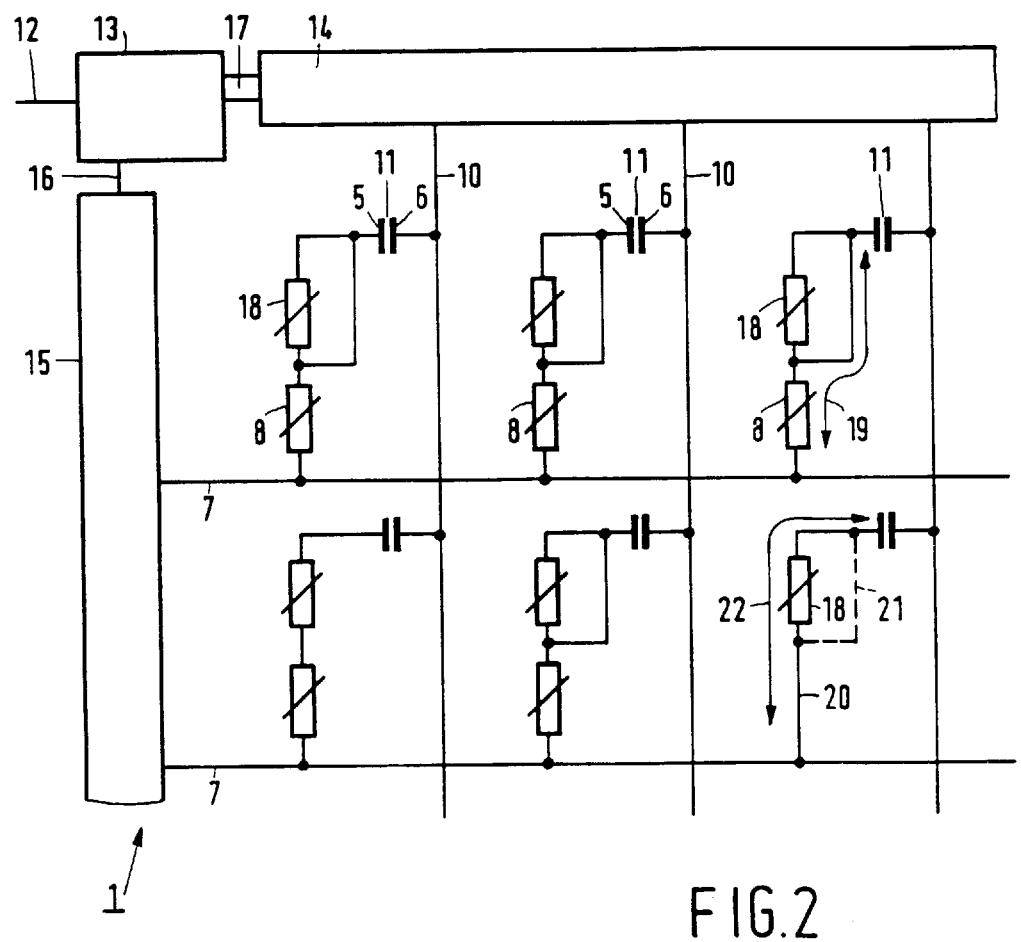
FIG. 2 shows diagrammatically a part of a display device according to the invention.

FIG. 2 shows diagrammatically a part of such a display device. The pixels 11 are connected via the picture electrodes 6 to the column electrodes 10 which, together with the row electrodes 7, are arranged in the form of a matrix in this example. The pixels 11 are connected to the row or selection electrodes 7 via the picture electrodes 5 and the switching elements (the MIMs 8). An incoming signal 12 is stored via a processing/control unit 13 in a data register 14 which presents the data signals (adapted, if necessary), to the column electrodes 10. This data determines the light transparency to be realised for the pixels 11. To this end the control unit 15 provides the row electrodes with selection signals. The control unit 13 synchronizes the operation of the control unit 15 and the data register 14 via lines 16 and 17.

According to the invention, second switching elements (for example, MIMs 18) are arranged between the picture electrodes 5 and the connections of the switching elements 8 connected to the picture electrodes 5. If a switching element 8 functions satisfactorily, a pixel 11 is charged or discharged via the current path 19 during operation. Since the second switching element 18 is short-circuited, as it were, there is no voltage across the second switching element, hence no voltage across the associated capacitor. The presence of the redundant switching element 18 thus hardly influences or has no influence on phenomena such as crosstalk and kick-back and will consequently not influence a good transmission setting.

If a switching element 8 does not function satisfactorily, it is short-circuited by means of laser repair so that a short-circuit path 20 is created; moreover, the connection 21 is interrupted, for example by means of "laser cutting". For the defect which occurs most frequently, viz. short-circuit of the switching element 8, only the connection 21 is to be interrupted. During operation, a pixel 11 is charged or discharged via the current path 22. Since the second switching element 18 takes over the function of switching element 8 and has substantially the same characteristics, the influence on phenomena such as crosstalk and kick-back is substantially the same.

Figure 3:
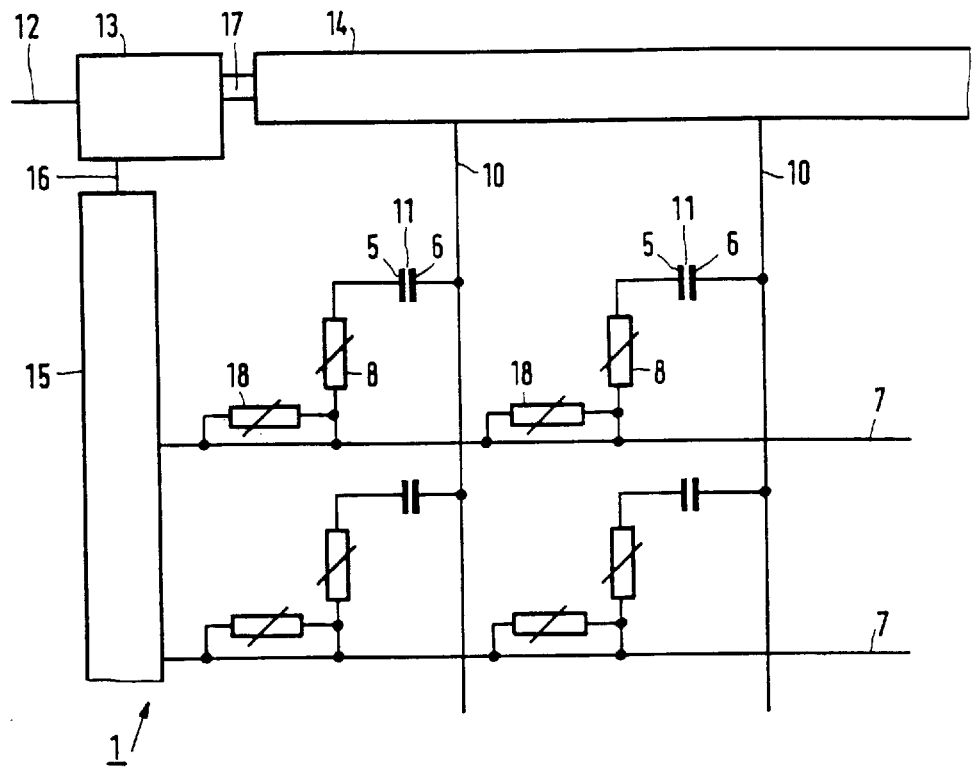
FIGS. 3 and 4 show a further embodiment of a display device according to the invention.
Figure 4:
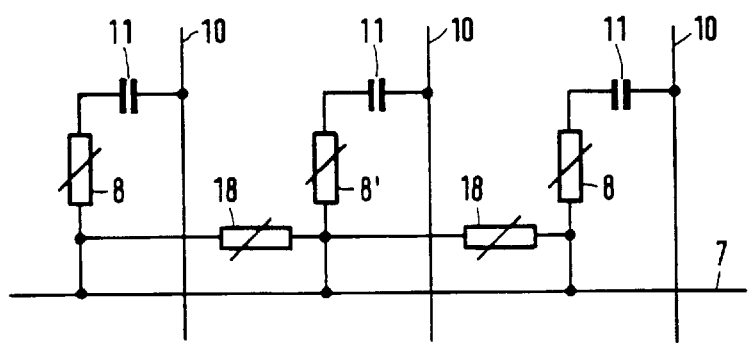

FIG. 3 shows an embodiment in which the extra switching element 18, in this case a MIM, is short-circuited by the row electrode 7. Since the MIM has a symmetrical current/voltage behaviour, the number of additional switching elements 18 can be halved, as is shown in FIG. 4. The additional MIM 18 can now be employed when either the MIM 8, or when the MIM 8' is defective. The MIM 18 may comprise a plurality of switches. From a layout-technical point of view, the embodiment of FIG. 4 can be implemented in such a favourable manner that a larger aperture is obtained than in the example shown in FIG. 2.

Figure 11:
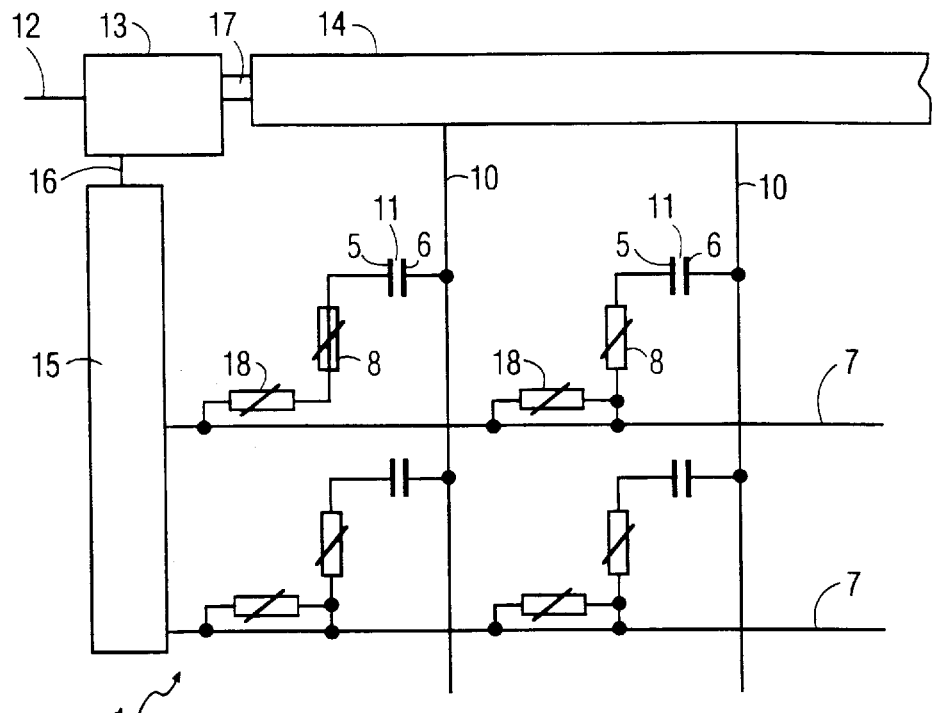
Figure 12:
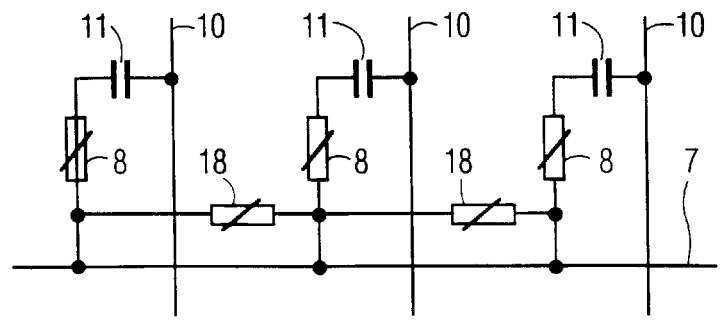

FIGS. 11 and 12 are identical to FIGS. 3 and 4, except that each shows a first switching element 8 short circuited, as indicated by the solid line drawn through it, and the line indicating the connection of this element to the row electrode 7 has been broken.

Figure 5:
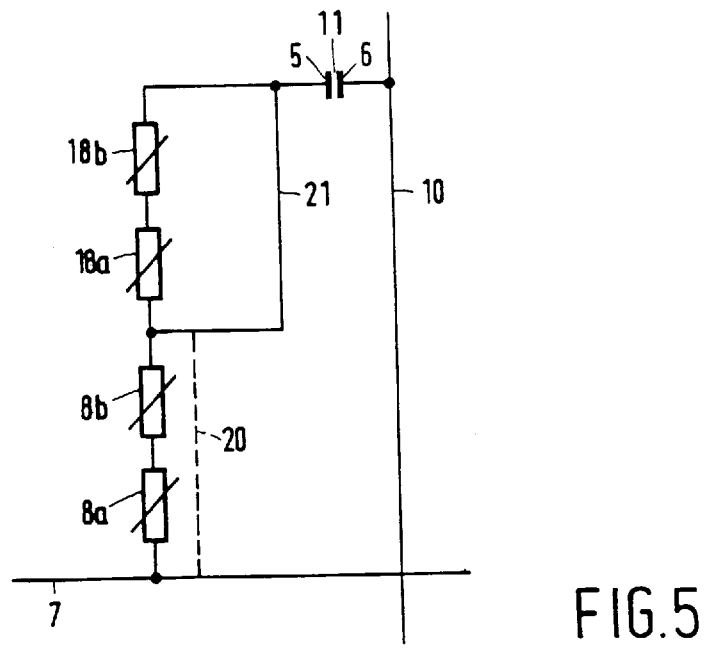
FIG. 5 shows a modification of a part of the device of FIG. 2.

FIG. 5 shows diagrammatically a modification of a part of the device of FIG. 2. Now, the switching elements 8, 18 are composed of sub-elements (in this example MIMs) $8^a$, $8^b$, $18^a$, $18^b$. At a short-circuit of one of the MIMs 8, the circuit will continue to function. To obtain an identical behaviour of a repaired and an unrepaired pixel with respect to its voltage/current behaviour, the two MIMs 8 are, however, preferably short-circuited, while the branch with the MIMs 18 is switched on; at a short-circuit of the two MIMs 8, the branch with the MIMs 18 (which may also be limited to one MIM) can be switched on similarly as described hereinbefore. For an open connection due to non-functioning of one of the MIMs 8, this MIM can be short-circuited and the other MIM will continue to function. If the defective MIM cannot be detected in this case, a short-circuit path 20 can be provided, similarly as in the case where the two MIMs have an open connection, while the connection 21 is opened.

Figure 6:
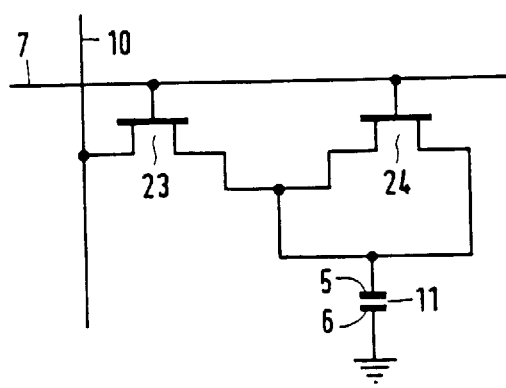
FIG. 6 shows a further modification of a part of a display device according to the invention.

FIG. 6 shows an embodiment in which TFTs are used as switching elements. Row and column electrodes 7 and 10 are now provided on a supporting plate, while a counter-electrode 6 which is common for the pixels 11 is present on the other supporting plate, which counter-electrode is connected to ground in this case. If there is a defect in TFT 23, the connections of this transistor can be modified again in such a way that its function is taken over by transistor (TFT) 24.

Figure 7:
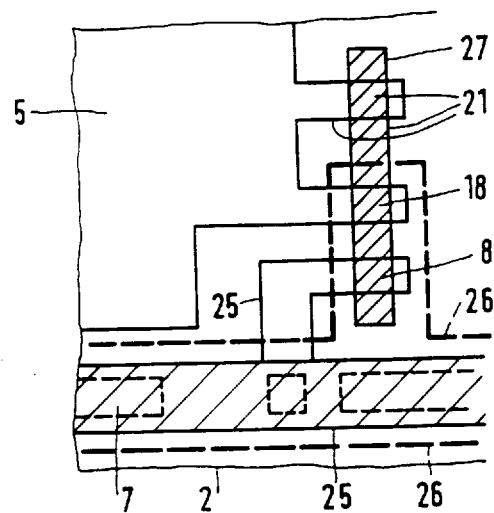
Figure 8:
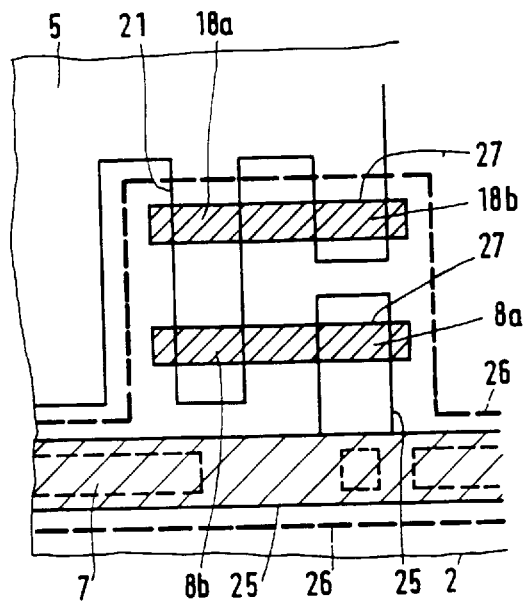

FIGS. 7 and 8 show plan views of possible realisations of the circuits of FIGS. 2 and 5, respectively. The supporting plate 2 is provided (in this example) with a transparent electrode pattern of, for example indium-tin oxide; this pattern comprises picture electrodes 5 and strips 25. A layer of an insulating material, for example silicon nitride is provided and patterned across a part of the strips and the picture electrodes, which is shown by means of broken lines 26 in FIGS. 7 and 8. Finally, a metallization pattern is provided, which comprises the row electrodes 7 and strips 27. At locations where the strips 27 overlap the indium-tin oxide, the overlapping parts, either together with the intermediate silicon nitride, constitute the MIMs 8, 18, or (at locations where no silicon nitride has been provided) form mutual contacts. The contacts may form part of the connection 21. In addition, similar contacts at the area of the row electrodes constitute the contacts of these row electrodes and the MIMs so that a safeguard against open row electrodes and a decrease of the row resistance is obtained.

Figure 9:
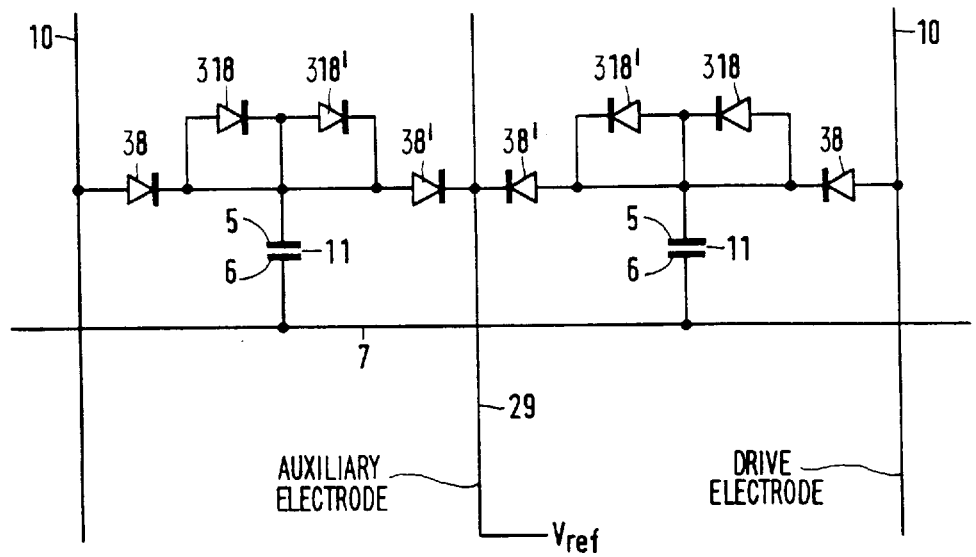
FIG. 9 shows a different use of the invention.
Figure 10:
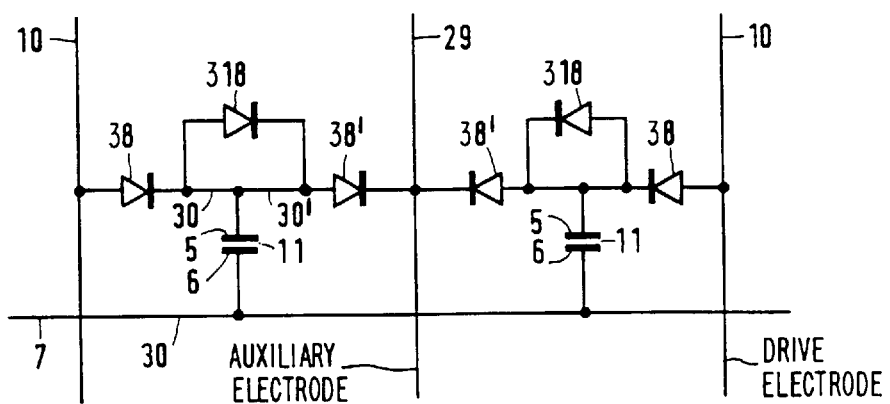
FIG. 10 shows a modification of FIG. 9, and FIGS. 11 and 12 show the embodiment of FIGS. 3 and 4 with a short circuited first switching element.

FIG. 9 shows an embodiment in which a pixel 11 is electrically connected to the common point of series-arranged diodes 38, 38' between a column electrode 10 and an electrode 29 for a reference voltage. The operation of such a circuit is described in U.S. Pat. No. 5,032,831. The device comprises additional diodes 318, 318' which may be switched on when one of the diodes 38, 38' is short-circuited. 30 If necessary, the function of the diodes 318, 318' can be fulfilled by one diode, as is shown in FIG. 10. If the diode 38 (38') in FIG. 10 is short-circuited, the connection 30 (30') is interrupted by means of laser cutting and diode 318 takes over the function of the short-circuited diode.

I claim:

1. A display device comprising an electro-optical display medium between a first and a second supporting plate and provided with at least one electrode selected from the group consisting of row electrodes, drive electrodes and auxiliary electrodes, which device comprises a plurality of facing first and second picture electrodes arranged on the supporting plates and defining pixels in the electro-optical display medium, a plurality of first switching elements provided on one of the supporting plates, at least one of the first switching elements electrically connected between a picture electrode and a drive electrode or an auxiliary electrode, in which the at least one first switching element forms part of a series arrangement including the picture electrode and the drive electrode or auxiliary electrode, and in which the at least one first switching element is electrically connected to a second switching element having substantially the same electrical characteristics as the first switching element, characterized in that the second switching element is connected in parallel with a part of the series arrangement which does not include the first switching element.

2. A display device as claimed in claim 1 in which the first supporting plate is provided with a second switching element between a first electrical connection to the first switching element and the picture electrode and a second electrical connection between the second switching element and the picture electrode.

3. A display device as claimed in claim 1, characterized in that at least one of the switching elements comprises a plurality of switches.

4. A display device as claimed in claim 1, characterized in that the switching elements or switches are MIMs.

5. A display device as claimed in claim 2, characterized in that the first and second switching elements or switches are first and second thin-film transistors (TFTs) each having a source, a drain, and a gate electrode.

6. A display device as claimed in claim 5, characterized in that the gate electrodes of the thin-film transistors are electrically connected to row electrodes, while the source electrodes of the first thin-film transistors associated with a plurality of picture electrodes are electrically connected to column electrodes and the drain electrodes are electrically connected to the picture electrodes and to source electrodes of second thin-film transistors associated with the picture electrodes, which second thin-film transistors have their drain electrodes electrically connected to the picture electrodes.

7. A display device as claimed in claim 1 in which for the picture electrode the first supporting plate is provided with the second switching element between a first electrical connection to a short-circuited first switching element and a second electrical connection between the second switching element and the picture electrode, the electrical connection between the short-circuited first switching element and the picture electrode being interrupted.

8. A display device as claimed in claim 7, characterized in that at least one of the switching elements comprises a plurality of switches.

9. A display device as claimed in claim 1 in which the first supporting plate is provided with the second switching element between a first electrical connection to the first switching element and the row electrode and a second electrical connection between the second switching element and the row electrode.

10. A display device as claimed in claim 9, characterized in that in a row the second switching element is common for two pixels in successive columns.

11. A display device as claimed in claim 10, characterized in that at least one of the switching elements comprises a plurality of switches.

12. A display device as claimed in claim 9, characterized in that at least one of the switching elements comprises a plurality of switches.

13. A display device as claimed in claim 1 in which for at least the picture electrode the first supporting plate is provided with the second switching element between a first electrical connection to a short-circuited first switching element and a second electrical connection between the second switching element and the row electrode, the electrical connection between the short-circuited first switching element and the row electrode being interrupted.

14. A display device as claimed in claim 13, characterized in that at least one of the switching elements comprises a plurality of switches.

15. A display device as claimed in claim 1 in which the first switching elements and the second switching elements are asymmetrical two-pole elements, the picture electrode is electrically connected to the common point of two first switching elements which are arranged in series between the drive electrode and the auxiliary electrode, and the first supporting plate is provided with at least one second switching element arranged at the same polarity as the two first switching elements, the second switching element arranged between a first electrical connection to one of the two first elements and the picture electrode and a second electrical connection between the second switching element and the picture electrode.

16. A display device as claimed in claim 1 in which the first switching elements and the second switching elements are asymmetrical two-pole elements, the picture electrode is electrically connected to the common point of two first switching elements which are arranged in series between the drive electrode and the auxiliary electrode, and the first supporting plate is provided with a second switching element arranged at the same polarity as the two first switching elements, the second switching element arranged between a first connection electrically connected to a short-circuited switching element of one of the two first switching elements and a second connection between the second switching element and the picture electrode, the electrical connection between the short-circuited first switching element and the picture electrode being interrupted.

* * * * *